R. C. PIERCE.
ELECTRIC WELDING MACHINE.
APPLICATION FILED MAY 22, 1916.
1,203,400.
Patented Oct. 31, 1916.
6 SHEETS—SHEET 2.
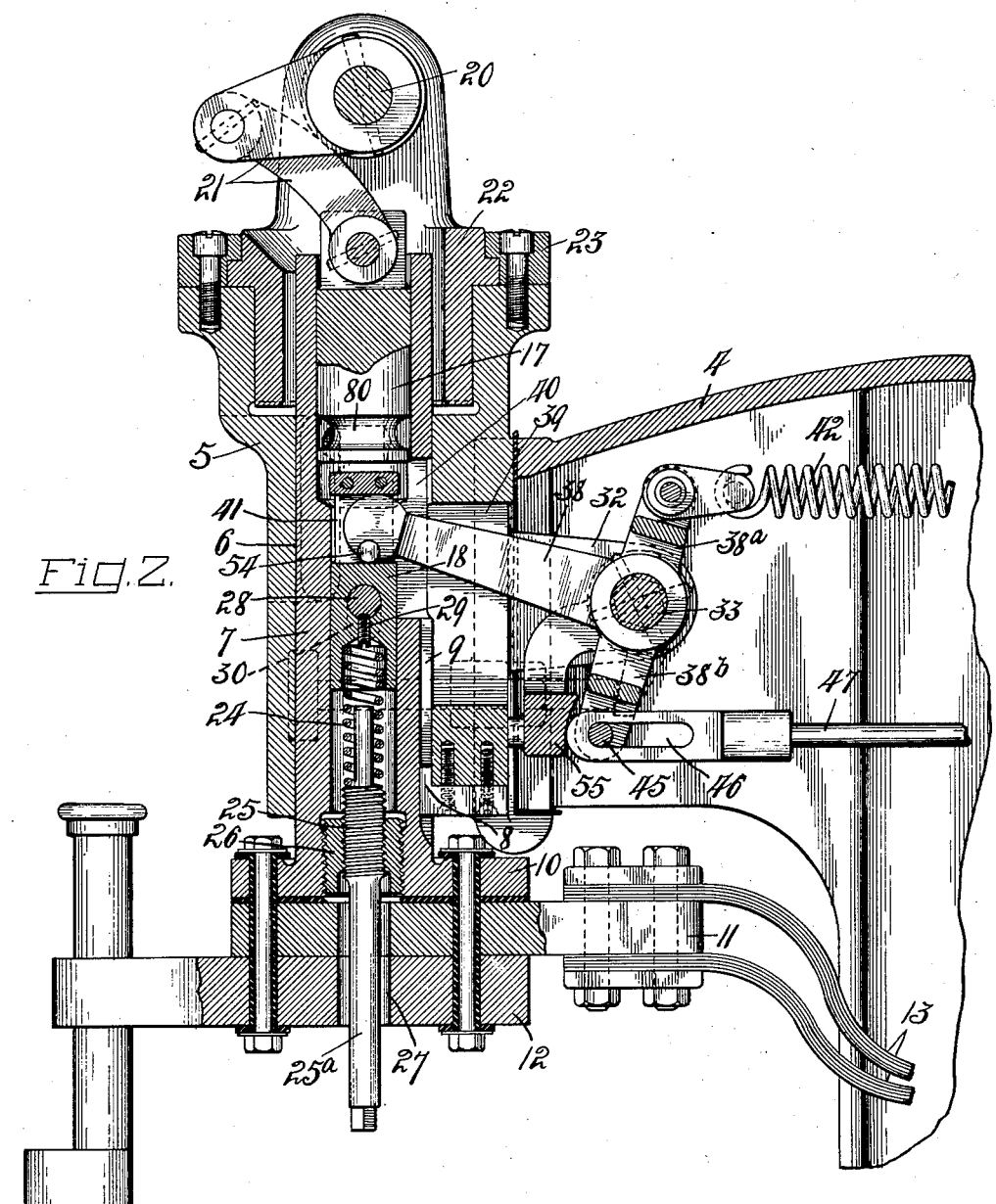
INVENTOR
Robert C. Pierce,
By Owen, Owen & Crampton,
His attys

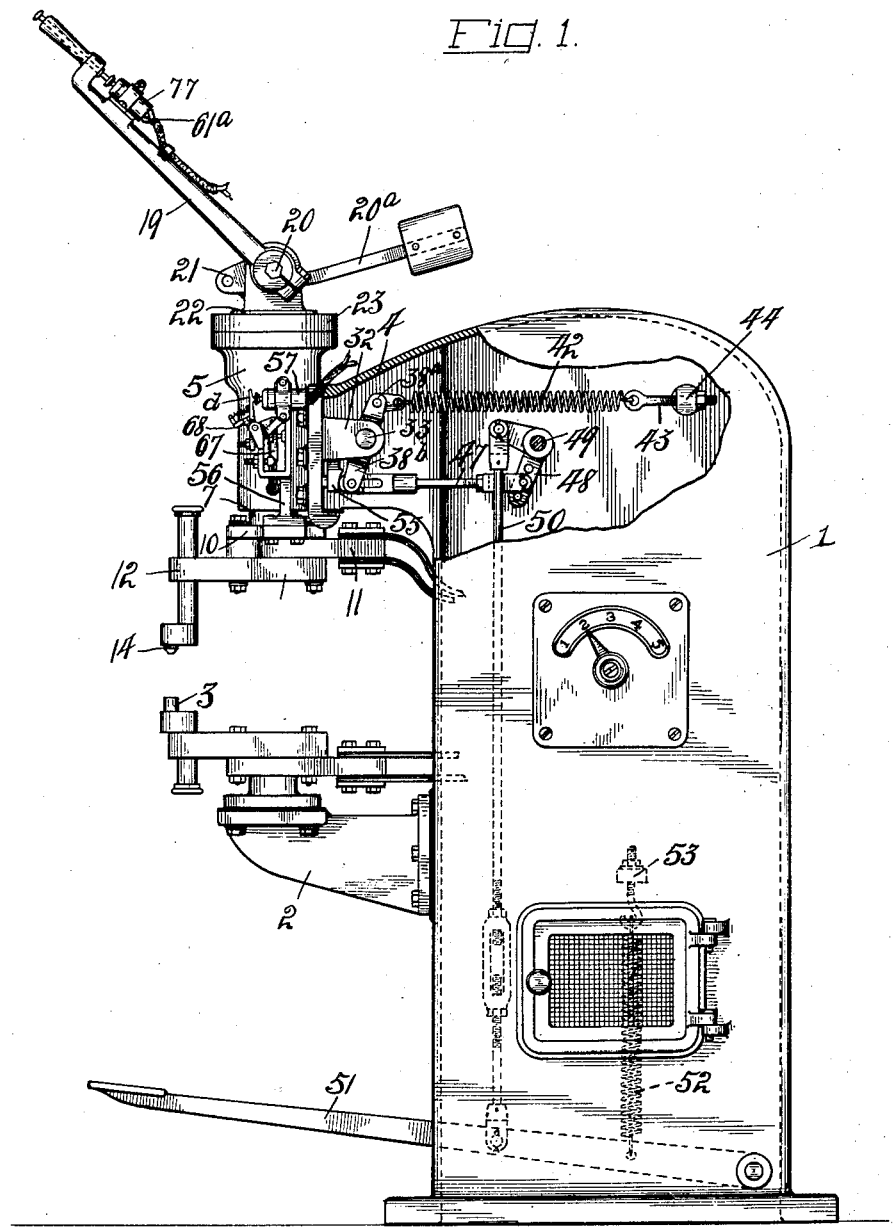

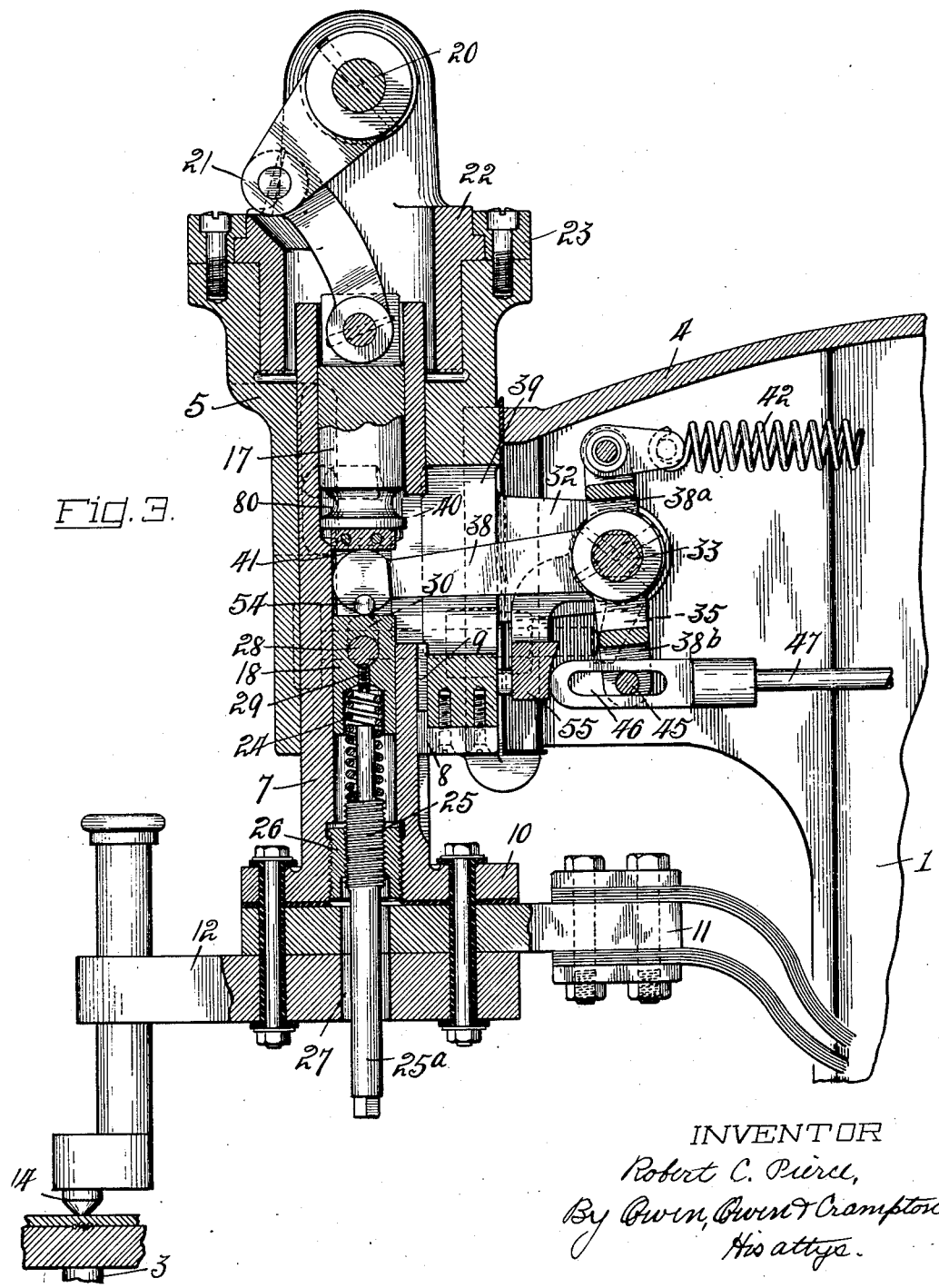

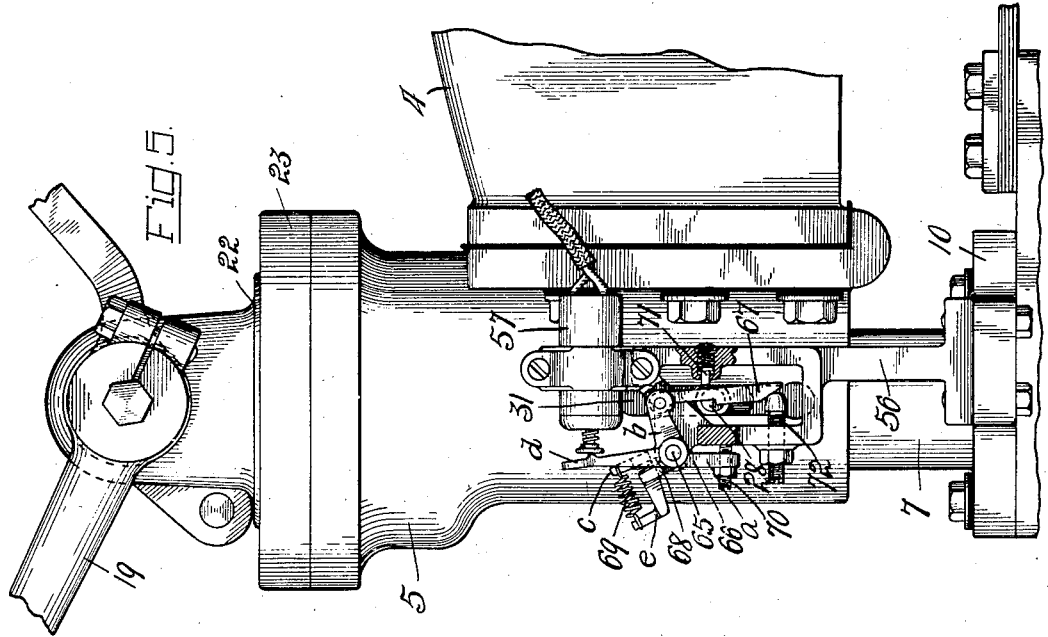
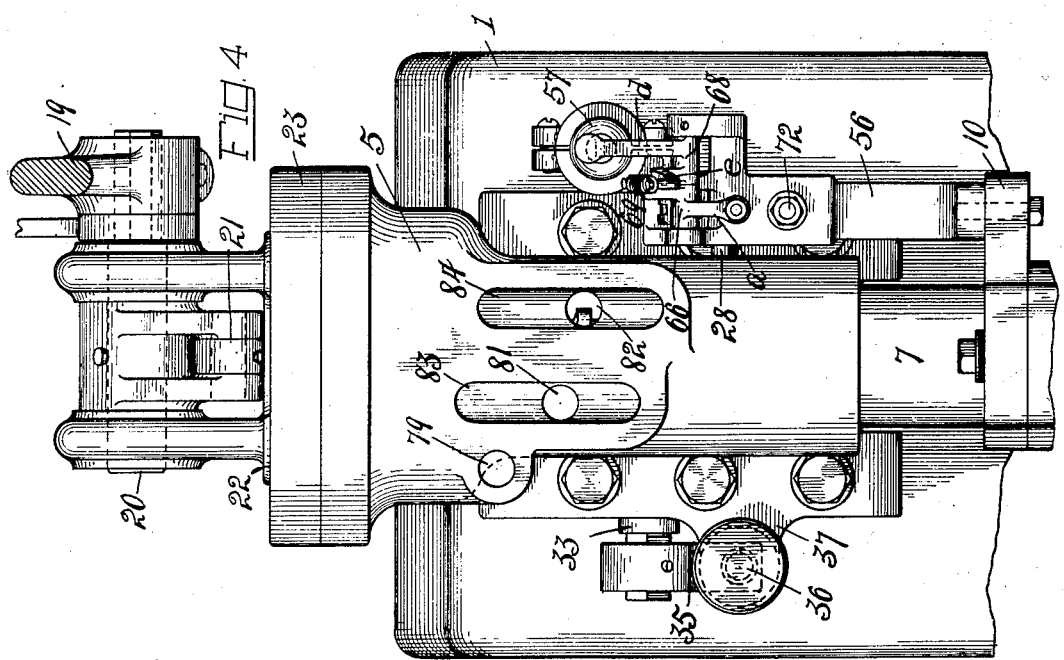
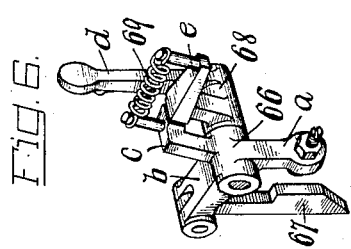

R. C. PIERCE.
ELECTRIC WELDING MACHINE.
APPLICATION FILED MAY 22, 1916.
1,203,400.
Patented Oct. 31, 1916.
6 SHEETS—SHEET 5.
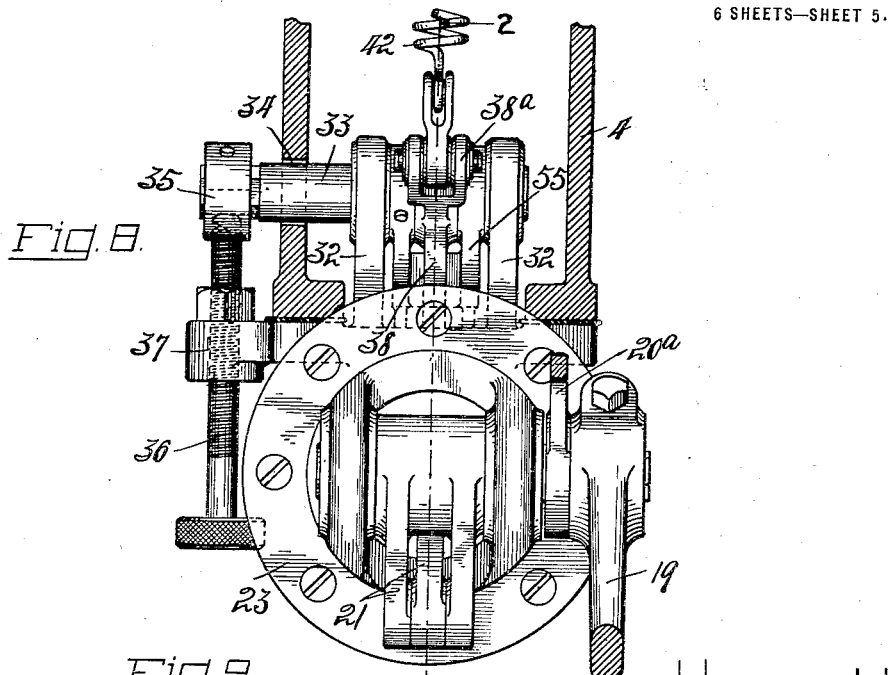
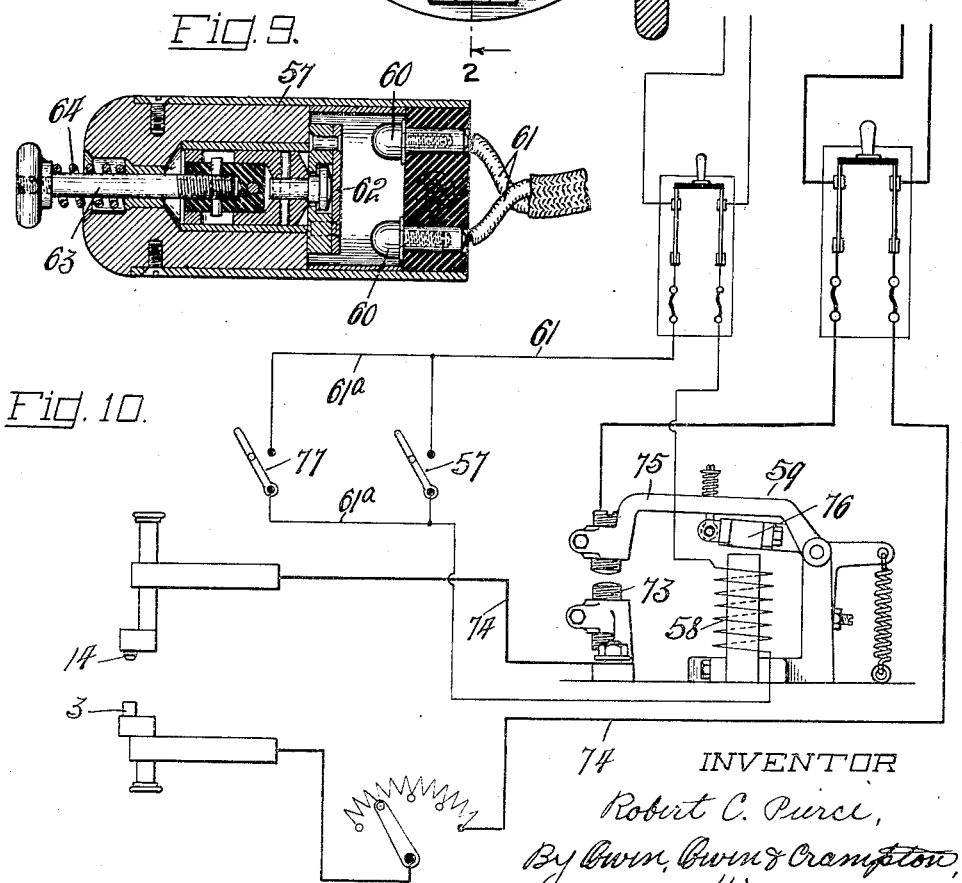
INVENTOR
Robert C. Pierce,
By Owen, Owen & Crampton,
His attys.

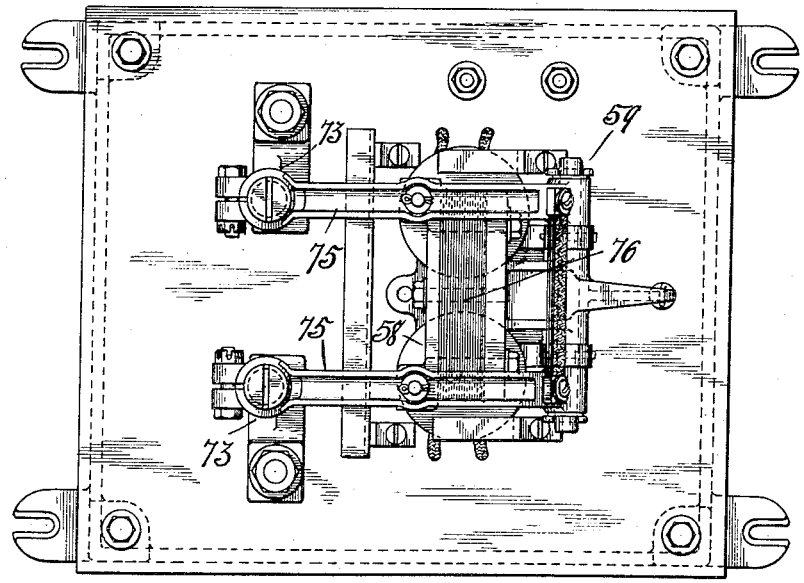
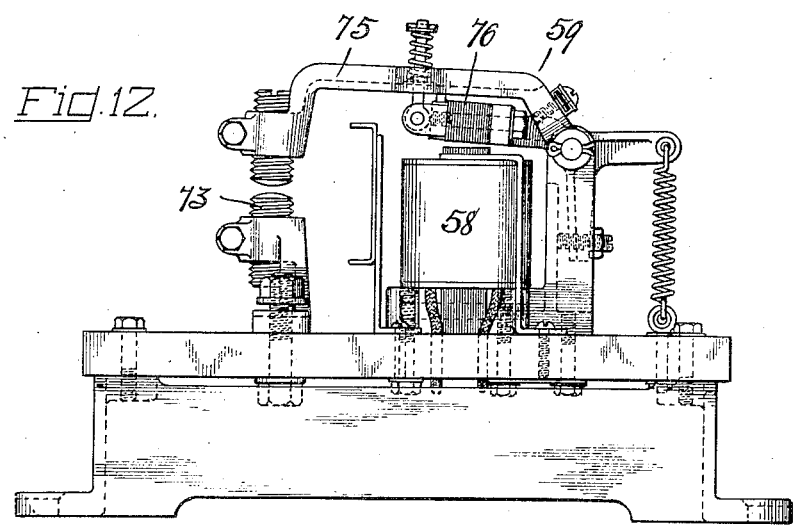

UNITED STATES PATENT OFFICE.

ROBERT C. PIERCE, OF CINCINNATI, OHIO, ASSIGNOR TO THE TOLEDO ELECTRIC WELDER COMPANY, OF CINCINNATI, OHIO, A CORPORATION OF OHIO.

ELECTRIC WELDING-MACHINE.

1,203,400.          Specification of Letters Patent.        Patented Oct. 31, 1916.

Application filed May 22, 1916. Serial No. 99,098.

*To all whom it may concern:*

Be it known that I, ROBERT C. PIERCE, a citizen of the United States, and a resident of Cincinnati, in the county of Hamilton, and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to electric welding machines, and particularly, but not necessarily, to those of the spot-welding type.

The primary object of my invention is the provision of improved means which is automatically operable to close a welding circuit when a predetermined pressure has been applied to the work by the welding dies, and to open the circuit when a further predetermined pressure has been applied to the work by the dies.

A further object of the invention is the provision, in an electric welding machine of the combination hand and foot operated type, of means which is automatically operable by either a hand or foot operating of the machine, without any readjustment or change, to close the welding circuits when a predetermined pressure has been applied to the work by the welding dies, and to open the circuit when a further predetermined pressure has been applied to the work by the dies.

A further object of my invention is the provision, in a machine of the class described having hand pressure-control means for the welding dies, of simple and efficient foot operated means for successively closing and opening the welding circuit.

A further object of my invention is the provision of improved means by which pressure is applied to the welding dies through the medium of a spring, said spring being easily and quickly adjustable to regulate its tension and also being capable of easy and quick removal for the insertion of another spring.

A further object of my invention is the provision of a machine of the character described which can be used with equal advantage in heavy slow welding, as in welding thick, buckled or scaly stock, and upon light, quick welding, as in welding thin clean stock, and can be easily and quickly adjusted for one or the other as regards pressure and the cutting in and out of the welding current.

Further objects and advantages of the invention will be apparent from the following detailed description thereof.

While the invention, in its broader aspect, is capable of embodiment in numerous forms, a preferred embodiment thereof is illustrated in the accompanying drawings, in which—

Figure 1 is a side elevation of a welding machine embodying the invention, with a portion broken away and with the parts in normal open position. Fig. 2 is an enlarged central vertical section of the mechanism embodying the invention taken on the line 2—2 in Fig. 8, with the parts in normal open position. Fig. 3 is a similar section with the plunger parts in full lowered position. Figs. 4 and 5 are enlarged front and side elevations of the portion of the machine embodying the invention, with parts broken away and with the operative parts in normal position. Fig. 6 is a perspective view of a portion of the master switch operating mechanism. Fig. 7 is a side view of a pin employed to lock the plunger parts in different positions of their relative movements. Fig. 8 is a top plan view of the portion of the machine embodying the invention, with a part in section. Fig. 9 is a sectional view of the master switch of the machine. Fig. 10 is a diagrammatical view of one form of wiring which may be employed in connection with the invention, and Figs. 11 and 12 are different views of the main or magnetic switch of the machine.

Referring to the drawings, 1 designates the machine frame, which is preferably of hollow form and has the lower arm or horn 2 projecting from one side thereof and carrying the lower or stationary electrode or welding die 3 of the set. Projecting from the frame above the arm 2 and from the same side thereof is a hollow arm or projection 4, to the outer end of which is bolted or otherwise suitably secured a stationary housing or plunger carrying head 5, which housing, in the present instance, is insulated from the arm 4.

The housing 5 has a vertical opening or plunger guiding passage 6 therethrough in which a plunger 7 of sleeve form is mounted for vertical reciprocatory movements, said plunger being prevented from turning within the housing 5 by a key 8, which is carried by the housing at the lower end thereof and works in a keyway 9 in the plunger. The plunger 7 has its lower end projecting below the housing 5 and formed with a flange or enlargement 10 at such end. A pair of blocks 11 and 12 are bolted or otherwise fixedly secured to the bottom of the plunger 7 one above the other, the block 11 having the flexible electrical leads 13 connected therewith, and the block 12 carrying the upper electrode or welding-die 14 in opposed relation to the lower die 3 of the set and in normally spaced relation thereto, as is well understood in the art.

Upper and lower plungers 17 and 18, respectively, are mounted in the plunger 7 for vertical reciprocatory movements therein, the plunger 17 having its movements controlled by a hand-lever 19, which projects from a shaft 20, and which shaft in turn has toggle-link connection 21 with the plunger 17. The shaft 20 is carried by a head 22, which is mounted for swivel movements in the upper end of the housing 5 in encircling relation to the upper end of the plunger 7, said head being retained in rotatable engagement with the housing by a collar 23. The lever 19 and plunger 17 are normally retained in elevated position by a weighted arm 20$^a$ projecting from the shaft 20.

The lower plunger 18, which is capable of reciprocatory movements independently of the plunger 17, is yieldingly supported in elevated position within the plunger 7 by a coiled compression spring 24, which has its upper end thrust against the lower end of the plunger 18, and its lower end thrust against an adjusting-screw 25, which projects up into the center of the plunger 7 through a bushing 26 in which it is threaded, said bushing being in turn threaded in the lower end of the plunger 7. The screw 25 has a stem 25$^a$ projecting downward therefrom through registering openings 27 in the blocks 11 and 12, with its lower end exposed below said blocks to facilitate a turning of the screw to adjust the tension of the spring 24. The bushing 26 and screw 25 can be removed from the plunger sleeve 7 to render access to the interior of said plunger, or the spring 24 may be removed through the bushing and another spring substituted therefor.

The plunger 18 has its reciprocatory movements limited with respect to the main plunger 7 by a pin 28, which projects transversely through the plunger 18, being fixed thereto by a set-screw 29, and has its ends working in registering vertically extending slots 30 in the respective sides of the main plunger 7, said slots, in the present instance, being of suitable length to limit the relative movements of the plungers 7 and 18 to one-half inch. It is evident that the plunger 18 is normally held in elevated position within the plunger 7 with its pin 28 in stop contact with the upper end walls of the slots 30 by the spring 24. One end of the pin 28 projects outward through a registering vertically disposed slot 31 in the housing 5 (see Fig. 5), and coacts with a trip mechanism, as hereinafter described, for effecting an automatic closing of an electric control circuit when the plunger 18 is lowered, provision being made to automatically release the engagement of the trip mechanism with the pin when the pin has traveled downward a predetermined extent.

Projecting within the outer end of the frame arm 4 from the rear side of the housing 5 are a pair of transversely spaced bearing arms 32 in which a shaft 33 is journaled, said shaft being horizontally disposed and having one end projecting without the adjacent side of the arm 4 through an opening 34 therein (Fig. 8), and provided at such end without the frame arm with a downwardly projecting finger 35 (Figs. 3, 4 and 8). The lower end of the finger 35 bears forward against an adjusting screw 36, which is threaded rearwardly through a boss 37 projecting from the respective side of the housing 5 at the rear edge thereof.

A lever 38 is loosely mounted on the shaft 33 between the bearing arms 32, 32 and projects forward therefrom through registering openings 39 and 40 provided in the rear sides of the housing 5 and plunger 7, respectively, and into an opening 41 in the upper portion of the plunger 18. The lever 38 is of T-form, with one cross-arm 38$^a$ thereof projecting upward from its inner end and connected by a coiled contractile spring 42 to a rod or member 43, which is adjustably anchored within the upper portion of the frame 1 at the rear of the lever, as at 44 (Fig. 1), thus causing the lever 38 to be normally held in elevated position. The lower arm 38$^b$ of the lever 38 projects downward from the inner end thereof and has a pin 45 at its free end projecting through a slot 46 provided longitudinally in the forward end of a horizontally projecting rod 47. This rod connects at its rear end to the downwardly projecting arm of a bell-crank lever 48, which is fulcrumed within the upper portion of the frame 1, as at 49, and has its other arm projecting forward and connected by a vertically disposed rod 50 to the foot-treadle 51 of the machine, which treadle is normally held in elevated position by a coiled contractile spring 52, that is adjustably anchored within the frame 1 above the foot-treadle, as at 53 (Fig. 1). It is evident that the pin 45 is normally held in contact with the front end wall of the slot 46 by the action of the spring 42 and that the lever 38 is permitted to have a downward rocking movement from its normal position without disturbing the position of the rod 46, or such rocking movement of the lever may be effected by a depression of the foot-treadle 51, which would cause a rocking of the bell-crank lever 48 and a rearward movement of the rod 47 from its normal position. A hardened steel roll 54 is carried at the forward end of the lever 38 within the plunger opening 41 in contact with the lower wall of said opening to reduce friction.

A yoke 55 projects forward and downward from the shaft 33, having its arms fixed to said shaft and its crown portion forming a stop with which the forward end of the control rod 47 coacts to limit the forward movements thereof, and consequently to limit the raising movement of the lever 38. It is evident that a turning of the shaft 33 by an adjustment of the screw 36 in contact with the finger 35 will effect an adjustment of the yoke 55 and vary the length of stroke of the lever 38, and consequently the plunger 18.

A standard 56 is mounted on the flange or enlargement 10 at the lower end of the main plunger 7 and rises therefrom at the side of the housing 5 from which the pin 28 projects. The upper end of this standard is of forked or U-form, with the rear leg thereof, in the present instance, longer than the front leg and carrying a master switch 57, which is in circuit with the winding of the electromagnet or magnets 58 of the magnetically controlled switch 59, which is disposed in the welding circuit, and one form of which is shown in detail in Figs. 11 and 12.

The master switch 57, which may be of any suitable or convenient construction, has the two spaced contacts 60, 60 from which the respective circuit wires 61, 61 extend, and the bridging-piece 62, which is carried by a plunger 63 that is mounted for reciprocatory movements in the case 57 lengthwise thereof to place the bridging-piece 62 into or out of circuit closing contact with the contacts 60, 60. A spring 64 acts on the plunger 63 to normally retain the bridging-piece 62 in open position. The outer end of the plunger 63 projects without the end of the case 57 in position to be manually or mechanically operated, as desired.

The outer end of the pin 28 projects between the legs of the upper forked end of the standard 56 and the front one of said legs carries a shaft 65 substantially parallel to and slightly above the horizontal plane of the pin 28. A lever 66 is mounted on the shaft 65 and has the three arms $a$, $b$ and $c$ projecting in different directions therefrom. The arm $b$ of said lever projects rearward from the shaft and carries a latch 67, which is intended to be engaged and moved downward by the pin 28 at a downward stroke thereof, thus communicating a rocking movement to the lever 66. Another lever 68 is carried by the shaft 65 for rocking movements relative to the lever 66 and comprises the arms $d$ and $e$, the arm $d$ extending upward in position to have inward thrust contact against the outer end of the plunger 63 of the master switch 57. The arm $e$ is of double-angled form, extending upward thence forward and then upward again from the shaft 65, and has its free end connected by a coiled contractile spring 69 to the upper end of the arm $c$ of the lever 66. The lever arm $c$ forms an anchoring part for the spring 69, and the pull exerted on the lever arm $e$ by said spring normally retains the arm $d$ in thrust contact with the plunger 63. Upon a downward movement of the latch 67 the anchoring arm $c$ for the spring 69 is moved rearward, thus increasing the tension of the spring 69 and causing it to exert a sufficient pull on the arm $e$ to cause the connected arm $d$ to force the plunger 63 inward to circuit closing position against the tension of the spring 64. The upward movement of the latch 67 is adjustably limited by a set-screw 70, that is carried by the arm $a$ of the lever 66 in position to have contact with the standard 56. The latch 67 is yieldingly held in engagement with the pin 28 by a spring-pressed plunger 71, which is carried by the rear leg of the standard 56 and bears forward against said latch. The lower end of the latch 67 has the forward side thereof tapered and in contact with an adjustable screw 72, whereby said latch is automatically released from engagement with the pin 28 at a predetermined point in a down stroke thereof. The screw 72 is adjustable to vary the point of release of the latch from the pin 28 to suit the conditions of welding, as desired.

The magnetic switch 59 has the two spaced contacts 73 disposed in the main welding circuit 74 (Fig. 10) of the machine and the circuit is closed across the contacts 73, 73 by a bridging member 75, which member is mounted for rocking movements to adapt it to be swung into and out of bridging contact with the contact 73. The bridging-member 75 carries an armature 76 at the outer ends of the electromagnets 58, whereby an energizing of the magnets attracts the armature thereto and causes a circuit closing movement to be imparted to the bridging-member, as is well understood in the art. It will be understood that the invention is not limited to the use in connection therewith of any particular type of master or magnetic switch, as the ones shown herein are merely for illustrative purposes, and in their details of construction form no part of the present invention, as each in itself is old.

77 designates a master switch similar to that shown in Figs. 5 and 9, which is mounted on the operating lever 19 of the machine in position to be manually operated by the operator. The lead wires of this switch are in series with the coil of the electro-magnets 58, and designated 61ª.

The operation of my machine is as follows: The operator having placed the work to be welded in proper position between the welding dies 3 and 14, pulls the hand operating lever 19 down, causing the toggle 21 to straighten and plunger 17 to move downward until it strikes the top of the lower plunger 18, after which a continuation of the down stroke of the lever 19 will cause the plungers 17 and 18 to move downward together, and will also cause the main plunger 7 to move downward therewith, due to the spring connection 24 between the plungers 7 and 18. This downward movement of the three plungers in unison is continued until the movable welding die 14, which is carried by the plunger 7, moves into contact with the work, thereby arresting the further movement of the plunger 7. Further movement of the lever 19 then causes the plungers 17 and 18 to move down in the plunger 7, compressing the spring 24 and moving the pin 28 downward the limit of its movement in the slots 30 and 31 in the plunger 7 and housing 5, respectively. This downward movement of the pin 28 relative to the plunger 7 causes a downward movement of the latch member 67, with which the outer end of said pin is engaged, and a consequent rocking of the lever 66 in a direction to exert a tension on the spring 69, which in turn imparts a yielding switch plunger compressing movement to the lever 68, thereby closing the control circuit switch 59. The closing of the control circuit 61 causes an energizing of the magnets in the magnetic switch 59 and a consequent attracting of the armature 76 and movement of the bridging-piece 75 into welding circuit closing position to effect the weld. When the pin 28 has reached a predetermined point in its downward stroke, after a closing of the welding circuit, the screw 72, in coaction with the latch 67, releases said latch from catch engagement with the pin 28 and permits a return of the levers 66 and 68 to normal position and an opening of the master switch 57, which permits an opening of the main switch 59. The welding of the work having thus been completed, the lever 19 is released and returns to its original position by the action of the counterweight 20ª and causes an elevation of the plunger 17. The plunger 18 is returned to its normal elevated position with respect to the plunger 7 by the action of the spring 24, and the plungers 18 and 7 are returned to their elevated positions with respect to the head 5 by the spring 42, which acts through the lever 38. It will be understood that during the cycle of movements above described the pin 45 on the lever arm 38ᵇ works freely in the slot 46 of the treadle rod 47. The inward movement of the plunger 18 is limited by the pin 45 striking against the end of the treadle rod slot 46 and said treadle rod is normally held in forward end abutting contact with the stop-yoke 55 by the action of the treadle spring 52. It is therefore apparent that an adjustment of the stop-yoke 55, which is effected by a turning of the screw 36, determines the length of stroke of the moving parts.

Should the machine be operated by the foot treadle 51 instead of by the hand lever 19, said hand lever and the plunger 17 remain stationary in their upper positions by the action of the counterweight 20ª. Upon a depression of the foot treadle 51 the lever 38 with which said foot treadle is connected is rocked downward against the tension of the spring 42 and imparts the down strokes to the plungers 18 and 7. The action of said plungers and the automatic cutting in and out of the welding circuit is then the same as above described in connection with the hand operating of the machine, the only difference being that downward movement is imparted to the plunger 18 by the lever 31 instead of by the plunger 17. It is thus apparent that the machine may be operated by means of the hand lever 19 or the foot treadle 51, or by both, without any changes or adjustments, and the welding current will be turned on and off by the automatic switch mechanism while the welding dies are closed upon the work and under different predetermined pressures, that is, the welding current will be turned on when a predetermined pressure has been exerted on the work by the welding dies and will be turned off when a greater predetermined pressure has been exerted on the work by the dies. Inasmuch as the automatic switch depends for its operation on the relative movements of the plungers 7 and 18, it will be evident that the switch action is entirely independent of the adjustment of the welding dies or of any other adjustments which may be made on the machine, and depends entirely on pressure which is determined by the tension of the spring 24.

Where a welding machine is used for both heavy and light welding and on different conditions of stock, as is frequently the case, it is important to have the machine adaptable for such different classes of work. For such purpose I have provided a pin 78 (Fig. 7) which, when the machine is being operated either by the hand lever 19 or foot treadle 51, as hereinbefore described, is placed in inoperative position within a socket 79 in the front of the housing 5, said pin being inactive and performing no function when in said socket. Should the plunger 17 be depressed until the circumferential groove 80 therein registers with the hole 81 in the main plunger 7 (see Fig. 4) and the pin 78 inserted therein, the plungers 17 and 7 will then be locked together. Now, when the hand lever 19 is pulled down the dies 3 and 14 will close on the work as before described, but no relative motion will be imparted to the pin 28 to operate the automatic switch mechanism. When the parts are in this position the foot treadle 51 may be depressed, which will cause the plunger 18 and pin 28 to move downward the necessary distance to operate the switch mechanism, or, if desired, the switch 77 on the hand lever may be operated by pushing in on the push-button at the end of the lever to close the control circuit and energize the magnet in the magnetic switch to turn on the welding current, the pressure on the switch button being released to break the current. Or, if desired, the magnetic switch control circuit may be closed and opened by manually pressing the arm d of the lever 68 inward to close the circuit in the master switch 57. This combination is used to apply firm positive pressure to the welding dies when welding heavy or buckled stock and when more pressure is necessary than can be obtained through the compression spring 24 between the plungers 7 and 18. If the pin 78 is inserted through the hole 82 in the plunger 7 and into the groove 80 in the plunger 17, which groove has been lowered into register therewith, the plungers 17 and 18 are both locked in completely lowered position and the automatic switch feature is thereby entirely cut out, it then being necessary to manually control the cutting in and out of the welding current by an inward pressing of the plunger in either of the master switches 57 or 77. This combination is used for heavy buckled stock, especially when it is desired to apply the current for a longer period of time than can be conveniently done by the use of the automatic switch. The holes 81 and 82 in the plunger 7 register with respective vertically elongated slots 83 and 84 in the front of the housing 5.

I wish it understood that my invention is not limited to any particular construction, arrangement or form of the parts, or to the use of the parts in the particular combinations shown, the drawings and description being merely illustrative of one embodiment of the invention and it being evident that numerous modifications can be made without department from the spirit of the claims.

Having thus described my invention, what I claim as new, and desire to secure by Letters Patent, is—

1. In an electric welding machine, an electric circuit, a die carrying plunger, a second plunger mounted for movements relative to said first plunger, means operable to move said second plunger relative to the first plunger, and mechanism operable to successively close and open said circuit when said plungers are relatively moved a predetermined extent.

2. In an electric welding machine, an electric circuit, a pair of relatively movable plungers carried one by the other, means operable to relatively move said plungers, and mechanism automatically operable to close and open said circuit at predetermined points in a relative movement of said plungers.

3. In an electric welding machine, an electric circuit, a die carrying plunger, a member yieldingly carried by said plunger, means operable to move said member from normal position with respect to the plunger, and mechanism operable to close and open said circuit at predetermined points in a relative movement of said member and plunger.

4. In an electric welding machine, an electric circuit, a die carrying plunger, a member carried by said plunger for yielding movements relative thereto, double manually controlled means operable to move said member from normal position with respect to said plunger, and mechanism automatically operable to close and open said circuit at predetermined points in a relative movement of said member and plunger.

5. In an electric welding machine, an electric circuit, a plunger, means operable to yieldingly apply pressure to said plunger to move it to operative position, and mechanism carried in part at least by said plunger and automatically operable to close said circuit when a predetermined pressure has been applied to said plunger by said means.

6. In an electric welding machine, an electric circuit, a plunger, means operable to yieldingly apply pressure to said plunger to move it to operative position, and mechanism carried in part at least by said plunger and automatically operable to close said circuit when a predetermined pressure has been applied to said plunger by said means, and to open said circuit when a further predetermined pressure has been applied to the plunger by said means.

7. In an electric welding machine, an electric circuit, a reciprocal die carrying part, a member movable relative to said part, means operable to apply a yielding pressure from said member to said part when the former is moved in one direction, means operable to move said member relative to said part, and mechanism partially carried by said part and automatically operable to close and open said circuit at different predetermined points in a relative movement of said member and part from normal relation.

8. In an electric welding machine, an electric circuit, a die carrying plunger, a member yieldingly carried by said plunger for movements relative thereto, means having connection with said member and operable to move it from normal position with respect to said plunger and to apply a work gripping pressure to the plunger through said member, and mechanism operable to close said circuit when a predetermined pressure has been applied to the member.

9. In an electric welding machine, an electric circuit, a die carrying plunger, means carried by and operable to move said plunger and having adjustable spring connection therewith, and mechanism operable to close and open said circuit upon the application of different predetermined pressures to said plunger by said means.

10. In an electric welding machine, an electric circuit, a die carrying plunger, a member carried by and reciprocally movable relative to said plunger, adjustable means operable to move said member relative to the plunger and to apply a yielding work gripping pressure to the latter through said spring, and mechanism operable to close said circuit at a predetermined point in a relative pressure applying movement of said member and plunger.

11. In an electric welding machine, an electric circuit, a die carrying plunger, a member carried by and movable lengthwise of said plunger, adjustable spring connection between said plunger and member, means operable to move said member relative to the plunger and to apply a yielding work gripping pressure to the latter through said spring, and mechanism operable to close said circuit at a predetermined point in a relative pressure applying movement of said member and plunger, and to subsequently open said circuit at a different predetermined point in the relative pressure applying movement of said member and plunger.

12. In an electric welding machine, an electric circuit, a die carrying plunger, a member mounted for reciprocatory movements in said plunger lengthwise thereof, means operable to move said member relative to the plunger and to apply a work gripping pressure to the latter, and mechanism operable to close said circuit upon the application of a predetermined pressure on said plunger by a movement of said member relative thereto.

13. In an electric welding machine, an electric circuit, a die carrying plunger, a member mounted for reciprocatory movements in said plunger lengthwise thereof, means operable to move said member relative to the plunger and to apply a work gripping pressure to the latter, and mechanism operable to close said circuit upon the application of a predetermined pressure on said plunger by a movement of said member relative thereto, and to open said circuit upon the application of a predetermined increased pressure on the plunger by said member.

14. In an electric welding machine, an electric circuit, a die carrying plunger, a member carried by said plunger for yielding movements relative thereto in a direction to apply work gripping pressure to said plunger, means operable to move said member from normal position relative to said plunger, and mechanism operable to automatically open and close said circuit at different predetermined points in a continued pressure applying movement of said member relative to said plunger.

15. In an electric welding machine, a die carrying plunger, means carried by and movable relative to said plunger and operable to apply a work gripping pressure thereto, an electric switch, and mechanism having a catch part disposed in the path of movement of a portion of said means and operable, by a pressure applying movement thereof, to actuate said mechanism to close said switch.

16. In an electric welding machine, a die carrying plunger, means movable relative to said plunger and operable to apply a work gripping pressure thereto, an electric switch, and mechanism having a catch part disposed in the path of movement of a portion of said means and operable, by a pressure applying movement thereof, to actuate said mechanism to close said switch, said catch part automatically releasing the engaging part of said means when a predetermined pressure has been applied by said means to the plunger.

17. In an electric welding machine, an electric circuit, a die carrying plunger of sleeve form, a member reciprocally mounted for longitudinal movements in said plunger, adjustable spring connection between said member and plunger, means operable to move said member from normal position to apply work gripping pressure to said plunger through said connection, and mechanism operable to close said circuit when a predetermined pressure has been exerted on said plunger through said member and connection.

18. In an electric welding machine, a die carrying plunger, and means operable to apply work gripping movements to said plunger and having a part entirely within the plunger in yielding connection therewith.

19. In an electric welding machine, a die carrying plunger, a member yieldingly carried by said plunger and movable therewith, and means projecting through a side of the plunger and operable to apply a yielding pressure in work gripping direction to the plunger through said member.

20. In an electric welding machine, a die carrying plunger of sleeve form, a member reciprocally mounted for longitudinal reciprocatory movements in said plunger, yielding connection between said member and plunger, and means projecting through a side of said plunger and operable to apply yielding work gripping pressure to said plunger through said member and connection.

21. In an electric welding machine, a die carrying plunger having an opening in its inner end, a member reciprocally mounted in said opening, a removable closure for the outer end of said opening, cushion means between said closure and member, and means operable to impart a work gripping pressure to said plunger through said member and means.

22. In an electric welding machine, a die carrying plunger having an opening in its inner end, a member mounted for longitudinal reciprocatory movements in said opening, a bushing removably mounted in the outer end of said opening, an adjusting-screw threaded through said bushing, a compression spring interposed between said member and screw in engagement therewith, said member being removable through said bushing, and means having connection with said member and operable to move the same to impart work gripping movement and pressure to said plunger through said spring.

23. In an electric welding machine, an electric circuit, a die carrying plunger, a member carried by said plunger for limited yielding movements relative thereto and having a part projecting therefrom transversely of said plunger, means operable through said member to move said plunger and to apply relative yielding movements to said member and plunger, and mechanism actuated by said member part to close said circuit upon a predetermined pressure applying movement of said member relative to said plunger.

24. In an electric welding machine, a plunger, an electric switch carried by said plunger, means operable to apply an operating pressure on said plunger, and mechanism operable to successively close and open the switch upon the application of an increasing operating pressure on said plunger by said means.

25. In an electric welding machine, a plunger, means operable to apply an operating pressure on said plunger, an electric circuit, and mechanism carried by said plunger and operable to close said circuit upon the application of a predetermined pressure on the plunger by said means.

26. In an electric welding machine, a plunger, means operable to apply an operating pressure on said plunger, an electric circuit, and mechanism carried by said plunger and operable to successively close and open said circuit upon the application of different predetermined pressures on the plunger by said means.

27. In an electric welding machine, an electric circuit, a die carrying plunger, mechanism operable to apply an operating movement and pressure to said plunger and to successively close and open said circuit upon the application of different predetermined pressures to said plunger, a portion of said mechanism being carried by said plunger.

28. In an electric welding machine, an electric circuit, a plunger, means operable to apply an operating pressure on said plunger and having a part movable relative to the plunger, and mechanism carried by said plunger and operable by said part at a predetermined point in its movement relative to said plunger to close said electric circuit.

29. In an electric welding machine, an electric circuit, a plunger, means operable to apply an operating pressure on said plunger and having a part movable relative to the plunger, and mechanism carried by said plunger and operable to successively close and open said circuit by said part at different predetermined points in its movement relative to said plunger.

30. In an electric welding machine, an electric circuit, a plunger, a member carried by said plunger for yielding movements relative thereto, means operable to apply an operating pressure on said plunger through said member, and mechanism carried by said plunger and automatically operable to close said circuit at a predetermined point in a pressure applying movement of said member relative to said plunger.

31. In an electric welding machine, an electric circuit, a plunger, a member yieldingly carried by said plunger for movements relative thereto, means operable to apply a yielding operating pressure to the plunger through said member, and mechanism carried by said plunger and operable to close said circuit upon the application of a predetermined operating pressure on the plunger by said member, and operable to open said circuit upon the application of a greater predetermined pressure on the plunger by said member.

32. In an electric welding machine, a normally open magnetically controlled electric switch, a normally open control circuit for said switch, a die moving plunger, means for applying an operating pressure on said plunger, and mechanism carried by said plunger and automatically operable to close said circuit upon the application of a predetermined operating pressure on said plunger.

33. In an electric welding machine, a normally open magnetically controlled electric switch, a normally open control circuit for said switch, a die moving plunger, means operable to apply an operating pressure on said plunger, and mechanism automatically operable to close said control circuit when a predetermined operating pressure has been applied to said plunger, and to open said circuit upon the application of a greater predetermined pressure to the plunger.

34. In an electric welding machine, a welding circuit, a normally open switch for said circuit, magnetic means operable when energized to effect a closing of said switch, a normally open control circuit for said means, a welding die, means operable to apply an operating pressure to said die, and mechanism carried by said plunger and operable to close said control circuit upon the application of a predetermined pressure on said die.

35. In an electric welding machine, an electric circuit, a die moving plunger, means yieldingly connected to said plunger and operable to apply an operating pressure on said plunger, and mechanism carried by said plunger and operable to close said circuit upon the application of a predetermined pressure on the plunger by said means.

36. In an electric welding machine, an electric circuit, a plunger, means having a control lever in yielding pressure applying connection with said plunger, and mechanism carried by said plunger and operable to close said circuit when a predetermined pressure has been applied to the plunger by said means.

37. In an electric welding machine, an electric circuit, a plunger, means having a control lever in yielding pressure applying connection with said plunger, and mechanism carried by said plunger and operable to close said circuit upon the application of one predetermined pressure by said means to the plunger, and to open the circuit upon the application of a greater predetermined operating pressure to said plunger.

38. In an electric welding machine, an electric circuit, a die carrying plunger, a second plunger reciprocally mounted in said first plunger, means operable to control the reciprocatory movements of said second plunger, means operable by an operating movement of said second plunger to first move said die carrying plunger to work engaging position and then to apply a yielding pressure thereto and mechanism operable by said last means to close said circuit when a predetermined operating pressure has been applied to said plunger.

39. In an electric welding machine, an electric circuit, a die carrying plunger, a second plunger reciprocally mounted in said first plunger, means operable to control the reciprocatory movements of said second plunger, means operable by an operating movement of said second plunger to first move said die carrying plunger to work engaging position and then to apply a yielding pressure thereto, and mechanism operable by said last means to close said circuit when a predetermined operating pressure has been applied to said plunger, and to open said circuit upon the application of a further predetermined pressure on said plunger.

40. In an electric welding machine, an electric circuit, a die carrying plunger, hand operated means for applying an operating pressure and movement to said plunger, foot operated means for applying yielding pressure and movement to said plunger independent of said hand operated means, and mechanism operable to close said circuit upon the application of a predetermined pressure on said plunger by said last means, and to open said circuit upon the application of a greater predetermined pressure by said last means.

41. In an electric welding machine, a normally open electric circuit, a die carrying plunger, hand operated means for applying an operating pressure and movement to said plunger, a member carried by said plunger for yielding movements relative thereto, foot operated means for acting on said member to apply a yielding operating pressure on said plunger through said member, and mechanism operable to close said circuit when a predetermined pressure has been applied to said plunger through said member, and to open said circuit when a greater predetermined pressure has been applied to the plunger through said member.

42. In an electric welding machine, a normally open electric circuit, a die carrying plunger, a second and a third plunger mounted for reciprocatory movements in said first plunger, said third plunger having yielding connection with the first plunger, means for anchoring the second plunger in one position of its movement in the first plunger, hand operated means for imparting movement to the second plunger and through it to the third plunger when anchored together, means operable to apply a yielding pressure applying movement to the first plunger through the third plunger, and mechanism operable to close said circuit at a predetermined point in the movement of said third plunger with respect to the first plunger.

43. In an electric welding machine, a normally open electric circuit, a die carrying plunger, a second and a third plunger mounted for reciprocatory movements in said first plunger, said third plunger having yielding connection with the first plunger, means for anchoring the second plunger in one position of its movement in the first plunger, hand operated means for imparting movement to the second plunger and through it to the third plunger when anchored together, means operable to apply a yielding pressure applying movement to the first plunger through the third plunger, and mechanism operable to close said circuit at a predetermined point in the movement of said third plunger with respect to the first plunger, and to open said circuit upon a further predetermined movement of the third plunger with respect to the first plunger.

44. In an electric welding machine, a normally open electric circuit, a plunger, means operable to apply a yielding operating pressure to said plunger, a control means movable relative to said plunger and capable of acting on said first means to apply pressure to said plunger, means for releasably locking said control means to said plunger to cause positive movement to be imparted to one from the other, and mechanism operable to close said circuit upon the application of a predetermined pressure on said plunger by said first means.

45. In an electric welding machine, a normally open electric circuit, a plunger, means operable to apply a yielding operating pressure to said plunger, a control means movable relative to said plunger and capable of acting on said first means to apply pressure to said plunger, means for releasably locking said control means to said plunger to cause positive movement to be imparted to one from the other, and mechanism operable to close said circuit upon the application of a predetermined pressure on said plunger by said first means, and to open said circuit upon the application of a further predetermined pressure of said plunger.

46. In an electric welding machine, a normally open electric circuit, a plunger, means operable to apply a yielding pressure to said plunger, a control means movable relative to said plunger and capable of acting on said first means to apply pressure to said plunger, means capable of releasably locking said control means to said plunger in different positions of its movement with respect thereto, whereby positive movements may be communicated to the plunger from said control means, and mechanism operable to close said circuit upon the application of a predetermined pressure on said plunger by said first means both when said control means is free for movement relative to the plunger and is locked in one position thereto.

47. In an electric welding machine, a normally open electric circuit, a plunger, means operable to apply a yielding pressure to said plunger, a control means movable relative to said plunger and capable of acting on said first means to apply pressure to said plunger, means capable of releasably locking said control means to said plunger in different positions of its movement with respect thereto, whereby positive movements may be communicated to the plunger from said control means, and mechanism operable to close said circuit upon the application of a predetermined pressure on said plunger by said first means both when said control means is free for movement relative to the plunger and is locked in one position thereto, and to open said circuit upon the application of a further predetermined pressure on said plunger.

48. In an electric welding machine, a plunger, a lever having yielding connection with said plunger and operable to exert a yielding operating pressure thereon, means normally retaining said lever in inoperative position, and control means having pin and slot connection with said lever and operable to impart plunger operating movements to said lever and adapted to remain stationary and to permit said lever to have rocking movements relative thereto.

49. In an electric welding machine, a plunger, a lever having yielding connection with said plunger to impart yielding operating movements thereto, means normally holding said lever in one position of its movement, control means normally standing in one position of its movement and having a member in pin and slot connection with said lever to adapt said member when moved from normal position to impart operating movements to said plunger, said member limiting the movement of said lever in one direction, and adjustable stop means for coacting with said member to vary the normal position thereof.

50. In an electric welding machine, a plunger, a member carried by said plunger for yielding movements relative thereto, a T-form of lever having one arm engaging said member, spring means attached to another arm of said lever to normally retain the member and plunger with which it coacts in inoperative position, control means connected to the third arm of said lever and operable to actuate said lever to impart an operating movement to the plunger through said member, and means adjustable to limit the spring-influenced movement of said lever.

51. In an electric welding machine, an electric circuit, two relatively movable yieldingly connected plungers, means operable to impart movements to one of said plungers, an electric switch carried by one plunger, and means carried by said plungers and actuated by relative movements thereof to close said switch.

52. In an electric welding machine, an electric circuit, two relatively movable yieldingly connected plungers, means operable to impart movements to one of said plungers, an electric switch carried by one plunger, and means carried by said plungers and actuated by relative movements of said plungers to first close and then open said switch.

53. In an electric welding machine, an electric circuit, two relatively movable yieldingly connected plungers, one of said plungers have a transversely projecting part, and mechanism carried by the other of said plungers and operable by said plunger part to close said circuit upon a predetermined relative movement of said plungers.

54. In an electric welding machine, an electric circuit, two relatively movable yieldingly connected plungers, one of said plungers having a transversely projecting part, and mechanism carried by the other of said plungers and operable by said plunger part to close and open said circuit upon predetermined relative movements of said plungers.

55. In an electric welding machine, an electric circuit, a die carrying plunger, a member yieldingly carried by said plunger, means for controlling the movements of said member, and means positively operated by said member at predetermined points in its yielding movement relative to the plunger to successively close and open said circuit.

56. In an electric welding machine, an electric circuit, a die carrying plunger, a member yieldingly carried by said plunger, means for controlling the movements of said member, and means positively operated by said member at a predetermined point in its yielding movement relative to the plunger to close said circuit.

In testimony whereof, I have hereunto signed my name to this specification.

ROBERT C. PIERCE.

Witnesses.
FRANK WARREN,
A. LAMMERDING.